June 3, 1969 D. A. VAN SAVAGE 3,447,250
PAINTING GUIDE KIT
Filed May 22, 1967 Sheet 1 of 2

INVENTOR
D. Annette Van Savage
BY Mortenson and Weigel
ATTORNEYS

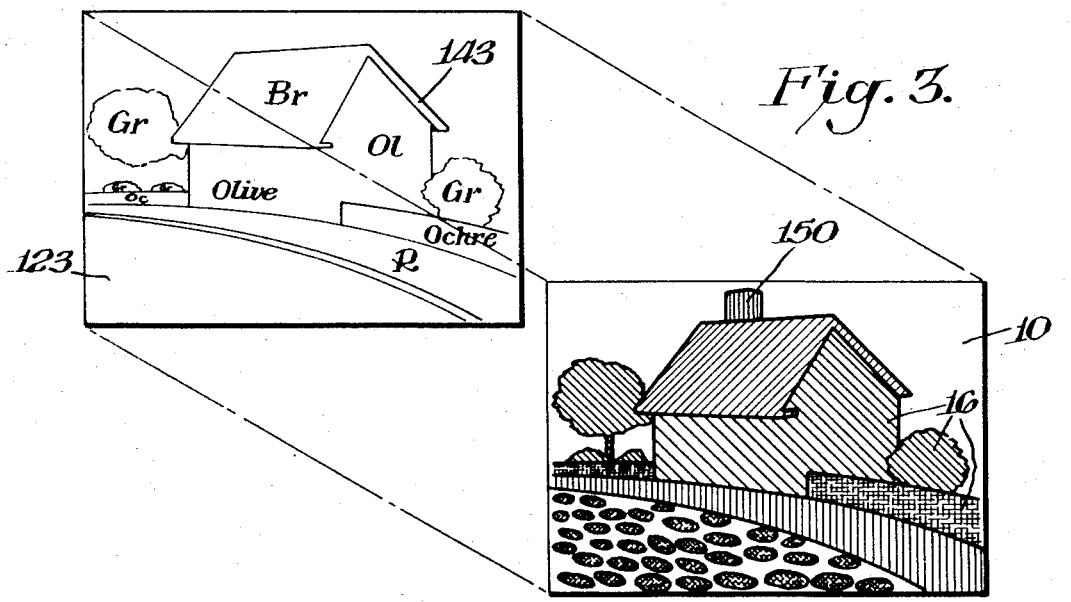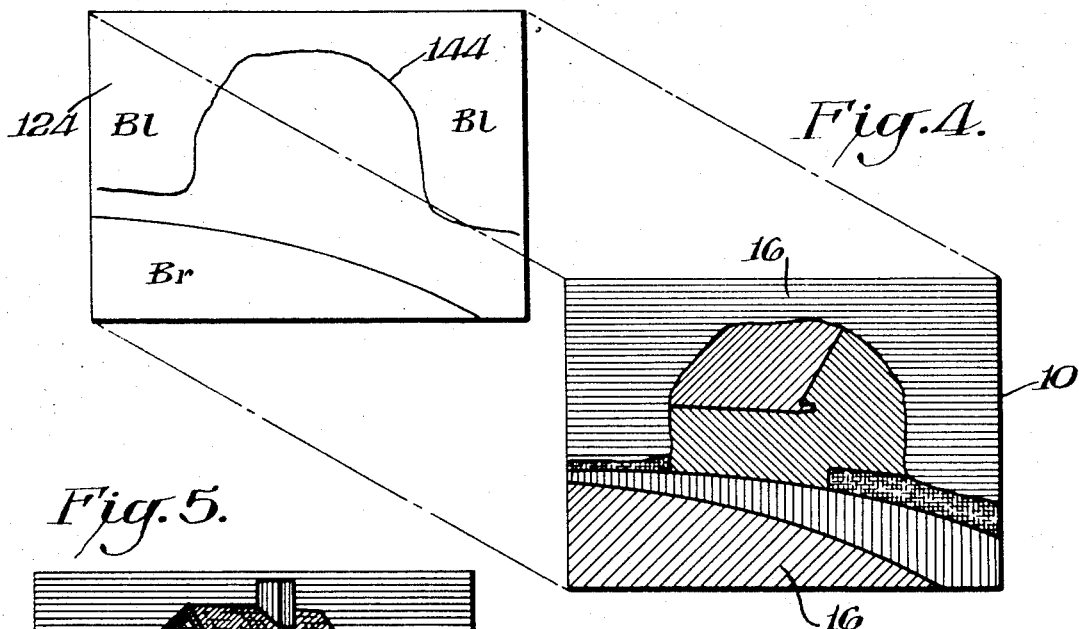

United States Patent Office 3,447,250
Patented June 3, 1969

3,447,250
PAINTING GUIDE KIT
Dolores Annette Van Savage, 2319 Patwynn Road,
Wynnwood, Wilmington, Del. 19803
Filed May 22, 1967, Ser. No. 639,963
Int. Cl. G09b 11/10
U.S. Cl. 35—26    3 Claims

ABSTRACT OF THE DISCLOSURE

A plurality of guide sheets each having an arrangement of painting aid indicia successively corresponding to foreground and then background objects of a picture, are employed in painting a picture on the back side of a sheet of transparent material.

---

This invention relates to a painting guide kit and, more particularly, to a painting kit which may be used by persons of varying skills to produce a high quality picture.

Over the years there has been developed many different types of devices for aiding the unskilled artist in painting. These devices have included various sighting devices as well as the commonly known painting-by-number techniques in which the would-be painter merely follows a numbered code to fill in different areas of a printed pattern with pigments, the result being a picture. While such devices do result in a picture, the art content of the picture may be in question, particularly if completed by an unskilled artist. Furthermore, the mere rote technique of filling in various spaces tends to become tedious and discouraging to the experienced as well as beginning artists.

Using such paint-by-number guides, the would-be artist is rather severely limited in his efforts to improve the artistry of the picture and to put something of "himself" into the picture. Additionally, such pictures are completely lacking in "line." The important features of the picture, i.e., the boundaries, are ill-defined. This means that the beginning artist need exert great effort in joining the edges of two color areas. The element of the picture referred to by the artist as good "line" is completely lacking.

An improved painting kit has been described in U.S. Patent 2,954,615 issued October 4, 1960, to Royce Brown. Brown teaches the idea of eliminating the problems of achieving good line in the painting by employing a transparent sheet of material that has permanently imprinted on its back side relatively broad line indicia corresponding to the boundaries between the different color areas. On the front or viewing side of the transparent sheet, various painting aid indicia corresponding to the various color areas of the picture are imprinted. The would-be artist merely paints on the back side over the printed line indicia and then fills in the various color areas to complete the picture. The transparent sheet is then turned over, the painting aid indicia washed off, and the picture is ready for mounting and may be viewed from the front side. While representing an improvement, over earlier techniques, Brown's method still requires the tedious problem of filling in the various indicated areas color-by-color. Hence, the element of tedium is not removed. This element of tedium is particularly difficult for the beginning or unskilled artist.

It is, therefore, an object of this invention to obviate many of the disadvantages of the prior art painting kits. Another object of this invention is to provide an improved artist painting medium which greatly simplifies the painting of highly pleasing pictures by skilled as well as beginning artists.

In accordance with a preferred embodiment of this invention, a sheet of transparent material is overlayed successively on a plurality of guide sheets. The first of the guide sheets contains an arrangement of decorating or painting information denoting certain foreground objects in the picture, in mirror image (reverse reading), and the color they are to be painted. The transparent sheet on which the picture is to be made is placed over this sheet and the indicated color area painted on the back or non-viewing side of the transparent sheet so placed. Successive guide sheets have other decorating information imprinted thereon corresponding first to intermediate details of the picture and later to background details. In this manner, as the painting progresses, larger and larger areas may be painted all on the back side of the transparent sheet without precise regard to the color boundaries and the previously painted areas are merely painted over. When completed, the transparent sheet is viewed from its front or viewing side and a complete picture is revealed.

In another embodiment of the invention, the first guide sheet may include lines corresponding to each of the elements of the picture and thereby defining tho color boundaries of the picture. These lines may be traced on the front viewing surface or back surface of the transparent sheet as a first step of the picture painting process. Alternatively, a raised material may be applied to the viewing surface to form the lines.

The novel features that are considered characteristic of this invention are set forth with particularity in the appended claims. The invention itself, however, both as to its organization and method of operation as well as additional objects and advantages thereof will best be understood from the following description when read in connection with the accompanying drawings, in which:

FIGURE 3 is an exploded view of the third, reverse-reading guide sheet having imprinted thereon some of the background objects which are next to be painted and the resulting painting on the reverse or back side of said transparent sheet;

FIGURE 4 is an exploded view of the fourth, reverse-reading guide sheet and the resulting painting which occurs on the back side of the transparent sheet;

FIGURE 5 is a plan view of the completed picture as viewed from the front side of the transparent sheet.

Figure 6:
FIGURE 6 is an enlarged fragmentary section illustrating the manner in which a painting is produced utilizing the guide and transparent sheets of this invention.

In the drawing there is seen, particularly in FIG. 6, a transparent sheet 10. The transparent sheet may be constructed from any suitable transparent or light penetrating material such as glass, plastic such as cellulose acetate film, regenerated cellulose film, poly(ethyleneterephthalate) film or the like. Although transparent sheets are preferred, in some cases sheets having some degrees of translucency may also be accommodated, such as frosted glass.

Figure 2:
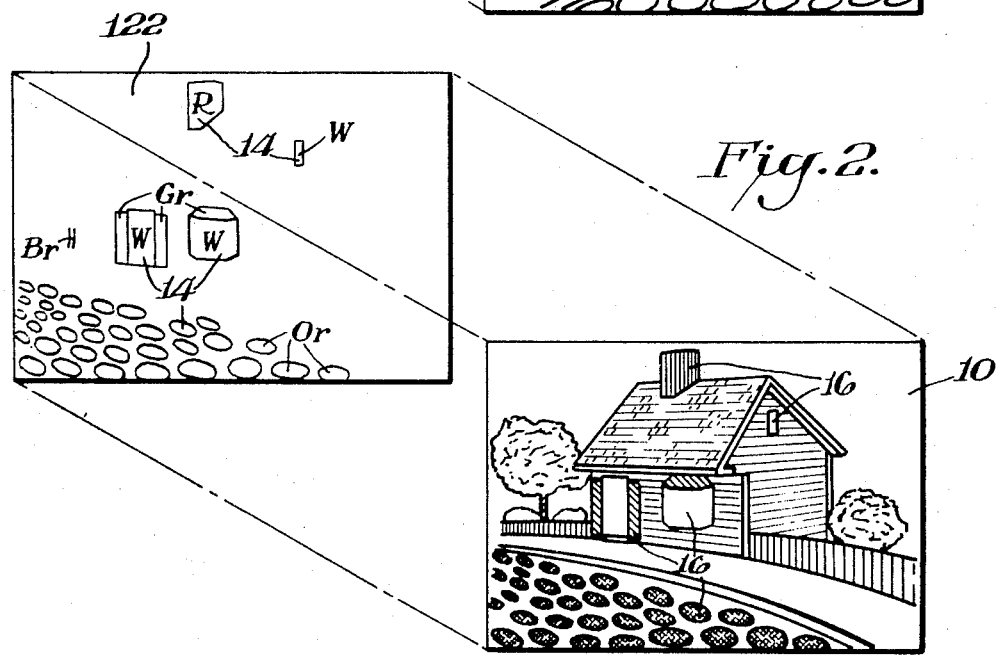
FIGURE 2 is an exploded view showing the second reverse-reading guide sheet having imprinted thereon painting guide information as to various foreground objects that are to be painted first on the back side of the transparent sheet.

The transparent sheet 10 is placed on top of a guide sheet 12 having imprinted thereon various painting or decorating information 14 which may be seen more clearly in FIG. 2 as defining the various areas or elements of the picture which are to be painted and the color to be applied to each area. This painting information is visible through the transparent sheet 10, when viewed from the back surface thereof, to permit a layer of paint or pigment 16 to be placed on the back side thereof as by a brush 18. When completed, the transparent sheet 10 is lifted up and viewed from its front side so that the painting 16 is on its back side may be seen clearly through the transparent sheet 10.

Figure 1:
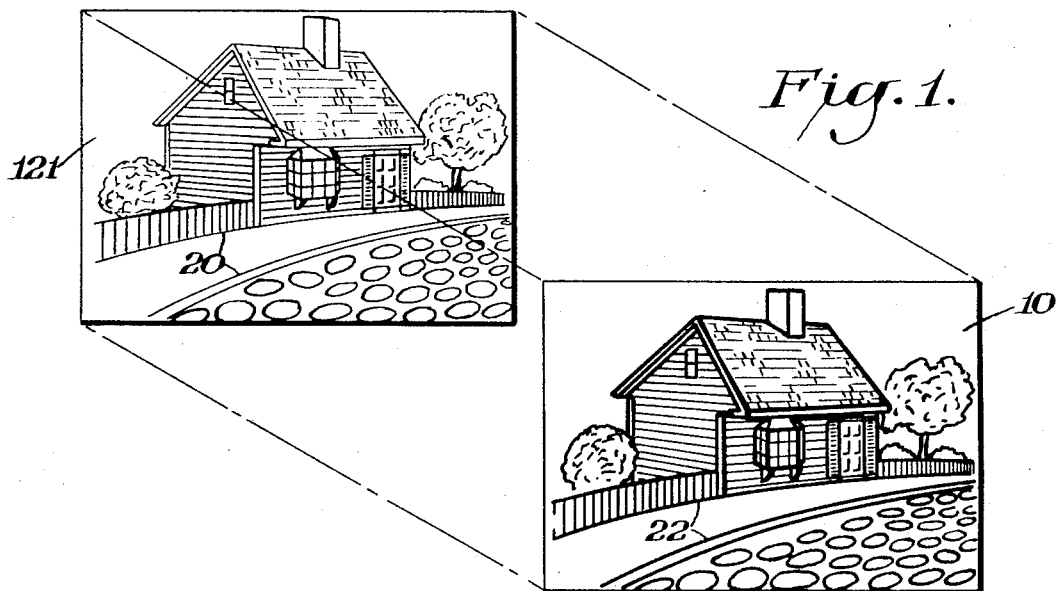
FIGURE 1 is an exploded view of the first right-reading, guide sheet of the invention having a line image of the picture thereon and the resulting broad line picture which is produced therefrom on the front side of a transparent sheet.

In accordance with this invention, a plurality of guide sheets are employed, each having different painting information 14 imprinted thereon. The particular preferred sequence is shown in the sequence of exploded views FIGS. 1 through 4 inclusive. In FIG. 1 the guide sheet 12 is right-reading and has imprinted thereon in this instance lines 20 defining most of the elements of the picture. While only a few lines are referred to, it is intended by 20 to refer to all of the lines that are to be traced. These lines 20 are traced when the transparent sheet 10 is placed in superimposed relation over (overlayed) the first guide sheet 121. The various lines 20 are traced with a relatively broad brush so as to give the picture a good "line" as may be seen by the lines 22 appearing on the transparent sheet 10. It will be noted that since the guide sheet 121 is right-reading, the transparency gives a direct idea of what the completed picture will look like. Accordingly, the transparent sheet in this instance is placed with its back side against the guide sheet 121 and the lines 22 are painted on its front side.

In the alternative, the first guide sheet 121 may have a reverse-reading outline of the picture, in which event the lines 22 are traced on the back side of the transparent sheet 10. Still another variation would entail applying a raised material to the viewing surface and covering the lines painted on either side of the sheet 10. This provides a pronounced stained glass window effect. The raised material may be a quick drying putty or cement, for example.

When the various color areas are to be filled in, however, the transparent sheet 10 always is reversed such that its front side is placed in superimposed or overlaying relation against the guide sheet 122 as seen in FIG. 2. In this case the various detail or foreground objects 14 are filled in with colors as indicated either by letters such as r, w, gr, or in the alternative the various colors may be indicated by a number coded color chart which may accompany the kit. In FIG. 2, the letter "r" indicates that the chimney is to be painted red; "gr" denotes parts of the door to be green, and so on. The step of FIG. 2 produces a result in which the various foreground objects are filled in on the back side of the transparent sheet 10, as denoted by the appropriate colored cross-hatched areas as seen thereon.

In the next step, the transparent sheet 10 is placed to overlay with its back side against the next guide sheet 123. This guide sheet 123 also is reverse-reading and directs, as may be noted in FIG. 3, that some of the larger or intermediate objects of the picture are to be filled in in accordance with the painting information 143. The various colored areas, as denoted by the guide sheet 123, are filled in as before on the back side of the transparent sheet 10.

In the step seen in FIG. 4, the transparent sheet 10 is placed to overlay (its back side up) the last reverse-reading guide sheet 124. Following this guide sheet, the very broad background objects such as the road and sky are painted in following the very rough outlines 144. It will be noted that the chimney 150, visible in the step shown in FIG. 3, is no longer visible since it has been covered up by the paint used in painting the sky. These steps produce what is a very rough picture as seen from the back side of the transparent sheet 10 in FIG. 4, but the picture, when viewed from the front, is now complete. The transparent sheet 10 is lifted off of the fourth guide pattern 124 of FIG. 4 with the result of the completed picture as seen in FIG. 5 through the front or viewing side of the transparent sheet 10. In this case, it will be noted that the lines 20 appear on the front side of the transparent sheet 10 whereas all of the color or pigments of the picture appear on the back side of the transparent sheet 10.

In producing the various foreground objects, the artist is quite free to exercise any degree of artistic freedom he or she desires in producing swirls, flourishes, blends, etc., of the various color areas and yet as the picture progresses the painting job becomes increasingly easier since the previously painted foreground areas are simply painted over, even with a relatively broad brush treatment by following the various guide areas which appear on the successive guide sheets. While good "line" is obtained in the first step of the picture by painting the various lines in the picture to be emphasized on the front or viewing surface of the sheet, this guide sheet may be omitted if desired. The result of the use of the guide sheets constructed in accordance with applicant's invention is that there are no gaps between color areas. The broader brush treatment of the successive steps would cause them to be filled in. The several color areas may be swirled or wiped to create the desired textural effect.

I claim:

1. An artist's painting kit comprising a plurality of sheets one of which is at least partially transparent and the remainder of which are sequential guide sheets, said one sheet being adapted to overlay each of said guide sheets, each of said guide sheets containing decorating information for use as guides to the user of said kit indicating to said user what opaque color materials are to be placed, where they are to be placed, and when they are to be placed on said one sheet as it successively overlays each guide sheet in its proper sequence, certain of said guide sheets depicting the decorating details in mirror image for placement of said color materials on the back surface of said one sheet, whereby said color materials first placed on the back surface of said one sheet mask color materials later placed on said back surface when viewed from the front surface of said one sheet, the first of said sequential guide sheets indicating the placement of foreground details on said one sheet, the latter of said guide sheets indicating the placement of background details on said one sheet.

2. A kit in accordance with claim 1 which includes a guide sheet containing the lines outlining in a right-reading manner the painting to be made, said guide sheet being used to effect the placement of said outline on said one sheet allowing the user to superimpose said outline on said mirror imaged details of a given successive guide sheet by turning said one sheet over and placing it in aligned position with said successive guide sheet.

3. A kit in accordance with claim 1 which includes a guide sheet containing the lines outlining in a reverse-reading manner the painting to be made, said guide sheet being used to effect the placement of said outline on said one sheet allowing the user to superimpose said outline on said mirror imaged details of a given successive guide sheet by placing said one sheet in aligned position with said successive guide sheet.

References Cited

UNITED STATES PATENTS

| 2,149,779 | 3/1939 | Kroner. | |
|---|---|---|---|
| 2,258,603 | 10/1941 | Forbell | 35—26 |
| 2,954,615 | 10/1960 | Brown | 35—26 |

FOREIGN PATENTS

| 384,919 | 12/1932 | Great Britain. |
|---|---|---|
| 951,184 | 3/1964 | Great Britain. |

EUGENE R. CAPOZIO, *Primary Examiner.*

H. S. SKOGQUIST, *Assistant Examiner.*